UNITED STATES PATENT OFFICE.

WILLIAM A. BRIGGS, OF PHILADELPHIA, PENNSYLVANIA.

ENAMEL.

1,409,919.  Specification of Letters Patent.  Patented Mar. 21, 1922.

No Drawing.   Application filed August 24, 1920.   Serial No. 405,715.

*To all whom it may concern:*

Be it known that I, WILLIAM A. BRIGGS, a subject of the King of Great Britain, residing at Philadelphia, in the county of Philadelphia and State of Pennsylvania, have invented certain new and useful Improvements in Enamel, of which the following is a specification.

One object of my invention is to provide an enamel which is virtually a solid fusible paint and provides a hard glossy surface impervious to all climatic influences and which possess unusual and hitherto unattained durability.

The composition of my improved enamel consists of from 25 to 55 parts by weight of a gum-resin of a high melting point such for example as copal gum or coumarone resin (synthetic coal tar resin), 5 to 35 parts by weight of rosin, (colophony), 10 to 40 parts by weight filler such as whiting or finely ground silicate and pigment such as iron oxide, lithophone or chrome green and 10 to 35 parts by weight vegetable or mineral oil.

My improved composition enamel is prepared by melting, by the application of heat, the fusible ingredients such as the gum-resin and rosin and stirring in the solids such as the pigments and fillers and the addition of oil to gain the consistency and hardness desired, said oil being used as a softening oil for the resin giving flexibility to the mass.

The enamel must be applied on a primary coating such for example as on a primary coating of varnish or paint which dries at ordinary atmospheric conditions preferably within forty-eight hours. I do not specifically confine my invention to the composition of this primary coating since many modifications are possible, but claim the application of the above enamel as described on any primary coating such for example as above specified; the enamel being applied in a hot molten state.

I have found that an enamel made in accordance with the above is virtually that of a solid fusible paint which produces a hard glossy surface impervious to all climatic influences and which possesses unusual and previously unattained durability.

In the claims I have used the term "filling material" and such term is meant to imply a filler and a pigment as above set forth or either a filler or a pigment.

Having thus described my invention, what I claim as new and desire to secure by Letters Patent is:—

1. A fusible solid anti-corrosive composition including gum-resin of a high melting point, rosin, filling material and oil.

2. A composition enamel including 25 to 55 parts by weight of a gum-resin of a high melting point, 5 to 35 parts by weight of rosin, 10 to 40 parts by weight of filling material, and 10 to 35 parts by weight of oil.

3. A fusible solid anti-corrosive composition including copal gum, rosin, filling material, and oil.

4. A composition enamel including 25 to 55 parts by weight of copal gum, 5 to 35 parts by weight of rosin, 10 to 40 parts by weight of filling material, and 10 to 35 parts by weight of oil.

In testimony whereof I have signed my name to this specification in the presence of two subscribing witnesses.

WILLIAM A. BRIGGS.

Witnesses:
ELIZABETH GARHE,
CHAS. E. POTTS.